United States Patent
Krug

(10) Patent No.: US 8,596,289 B2
(45) Date of Patent: Dec. 3, 2013

(54) PRESSURE REGULATING FLOAT VALVE

(75) Inventor: David Scott Krug, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 179 days.

(21) Appl. No.: 13/278,900

(22) Filed: Oct. 21, 2011

(65) Prior Publication Data

US 2013/0098451 A1    Apr. 25, 2013

(51) Int. Cl.
    *F16K 31/18*    (2006.01)
(52) U.S. Cl.
    USPC .............. 137/15.26; 137/448; 244/135 R; 244/135 C
(58) Field of Classification Search
    USPC .......... 137/15.26, 38, 41, 165, 187, 188, 192, 137/197, 198, 171, 202, 315.08, 427, 137/395–399, 409, 410, 448, 447, 445; 119/78; 251/87; 244/135 R, 135 A, 244/135 C
    See application file for complete search history.

(56) References Cited

U.S. PATENT DOCUMENTS

| | | | | |
|---|---|---|---|---|
| 1,511,163 A | * | 10/1924 | Heid | 137/209 |
| 1,841,663 A | * | 1/1932 | Miller | 137/39 |
| 2,845,937 A | | 8/1958 | Ksieski | |
| 3,355,862 A | * | 12/1967 | Blanchet et al. | 96/164 |
| 3,691,730 A | * | 9/1972 | Hickey et al. | 96/161 |
| 3,726,303 A | * | 4/1973 | Allen et al. | 137/202 |
| 3,782,400 A | * | 1/1974 | Hardison et al. | 137/39 |
| 3,948,626 A | * | 4/1976 | Bragg | 96/158 |
| 4,164,955 A | * | 8/1979 | Allen | 137/202 |
| 4,796,650 A | * | 1/1989 | Hwang | 137/443 |
| 5,031,655 A | | 7/1991 | Hebaus | |
| 5,901,744 A | * | 5/1999 | Richards | 137/202 |

* cited by examiner

*Primary Examiner* — Craig Schneider
*Assistant Examiner* — Craig J Price
(74) *Attorney, Agent, or Firm* — Weiss & Moy, P.C.

(57) ABSTRACT

A fuel system for an aircraft has a vent system. The system has a conduit opening into the fuel section. The system has a member connected to the conduit at a proximal end. The member has a seal plate within the conduit sealing the opening into the fuel section when a buoyant section at a distal end rises along with the seal plate through the member with a rise in fluid level within the fuel section.

18 Claims, 4 Drawing Sheets

PRESSURE REGULATING FLOAT VALVE

BACKGROUND

Embodiments of this disclosure generally relate to vent systems in aircraft, and more particularly, to a pressure regulating float valve for the control of fuel entering into a fuel surge tank from the wing fuel tank of a fuel system.

Aircraft with swept wings and integral wing fuel tanks may use float valves on their outboard tanks to prevent excess fuel transfer to the fuel surge tanks during rotation or other maneuvers. The float valve may have a float and seal plate inside the wing fuel tank. The float valve may have a see-saw type pivot design. The float valve may be opened to allow for pressure equalization between the wing fuel tank and the surge fuel tank.

During certain maneuvers on the ground and in flight, fuel movement within the fuel tanks may result in the float valves closing and preventing the wing tank from venting. If the pressure inside the tank increases significantly due to altitude changes or fuel transfer or inert gas injection while the float valve is closed, damage to the fuel tank structure may occur. Alternatively, the tank structure may be suitably sized to withstand such pressure increases. However, this may increase the weight of the airplane and affect performance.

Therefore, it would be desirable to provide a vent system for an aircraft and methods thereof that overcome the above problems.

SUMMARY

A fuel system for an aircraft has a vent system. The vent system has a subsystem element, the pressure regulating float valve. The float valve has a conduit opening connecting the wing fuel tank and fuel surge tank. The float valve has a member connected to the conduit at a proximal end. The member has a seal plate within the conduit sealing the opening into the fuel surge tank section when a buoyant section at a distal end rises along with the cover through the member with a rise in fluid level within the fuel section.

The subsystem element has a housing. The housing has a main section and a conduit opening into the main section. The subsystem element has a pressure regulating float valve mechanism. The float valve mechanism has a beam pivotally connected to a top of the main section at a proximal end. The float valve mechanism has a buoyant member connected at a distal end and a seal plate connected to the beam through a structure, the structure extending the seal plate into the conduit. The buoyant member raises the seal plate and the structure through the beam and closes the opening into the main section with an increase of fluid within the main section.

A method for regulating pressure in a vent system for an aircraft comprises: pivoting a beam around a hinge connected to a conduit when a buoyant member connected at a distal end rises with an increase of fluid level within a fuel tank; raising a seal plate within the conduit through the beam sealing an opening of the conduit when the fluid level within the fuel tank is at or above a predefined limit; and removing the sealing when a threshold value of pressure builds up in the fuel tank by depressing the seal plate, and thereby submerging the beam, and the buoyant member.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
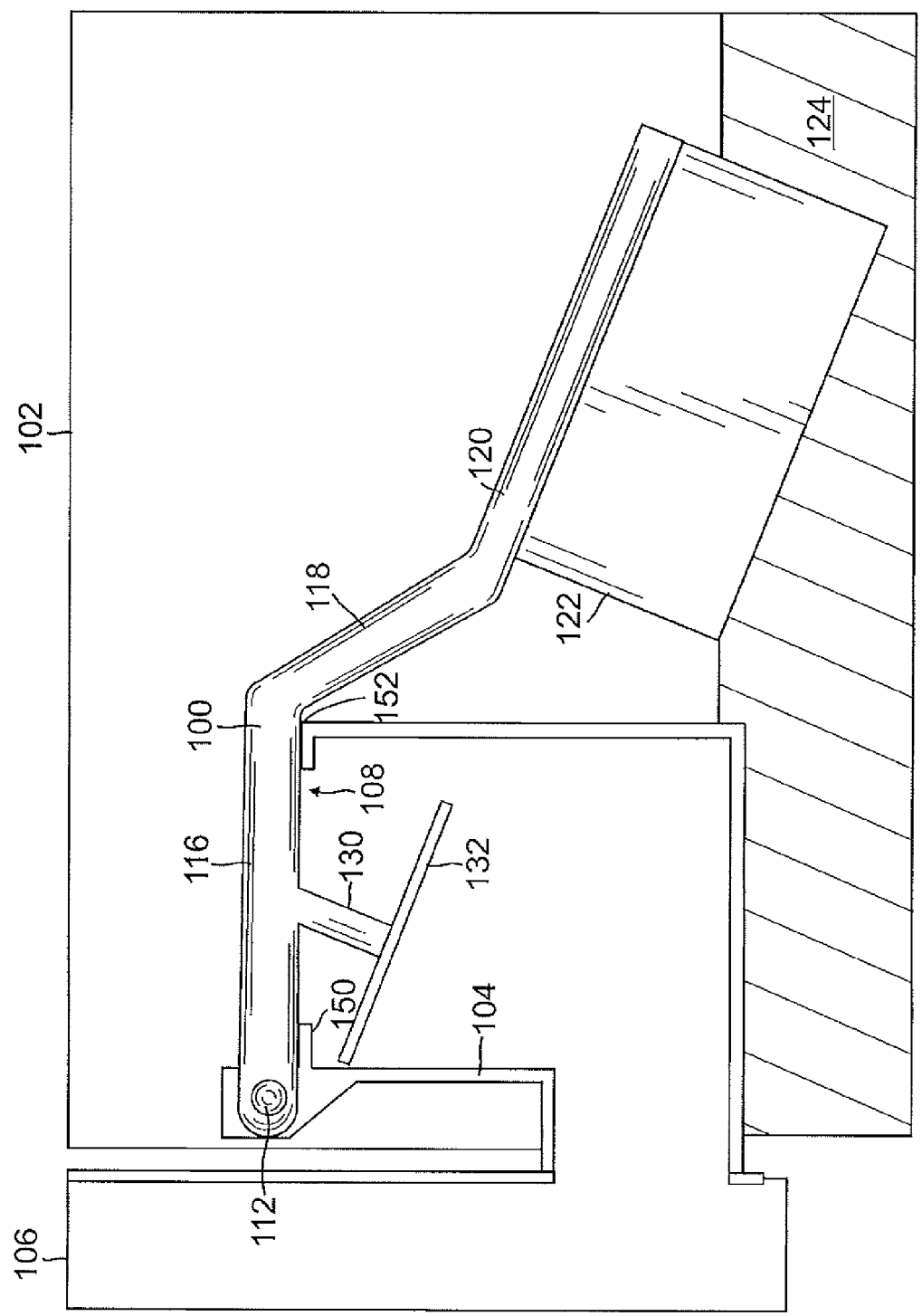
FIG. 1 is a diagram of a generalized architecture of a fuel tank having an exemplary pressure regulating float valve in a lowered position.
Figure 2:
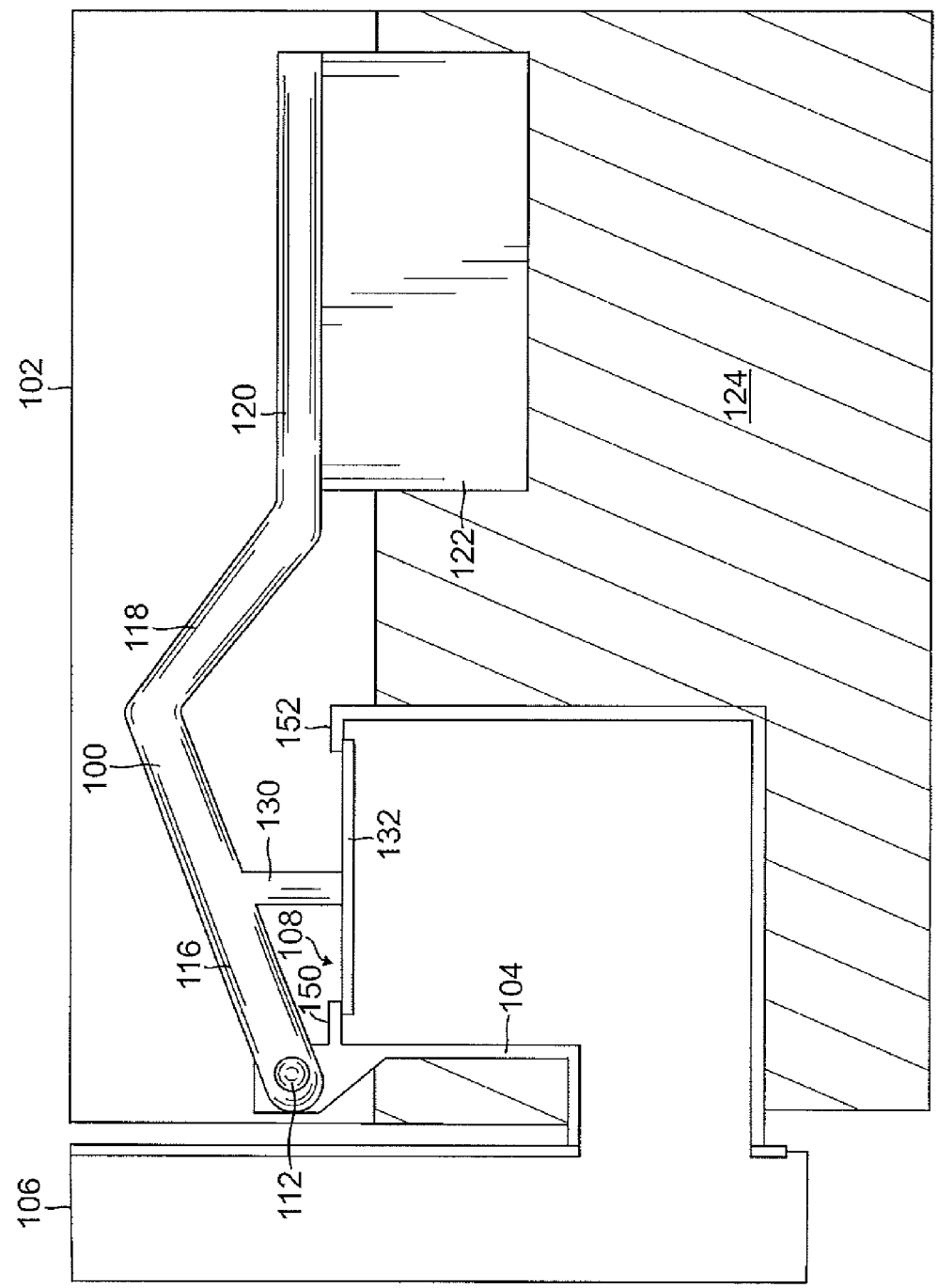
FIG. 2 is a diagram of the exemplary pressure regulating float valve in a raised position.
Figure 3:
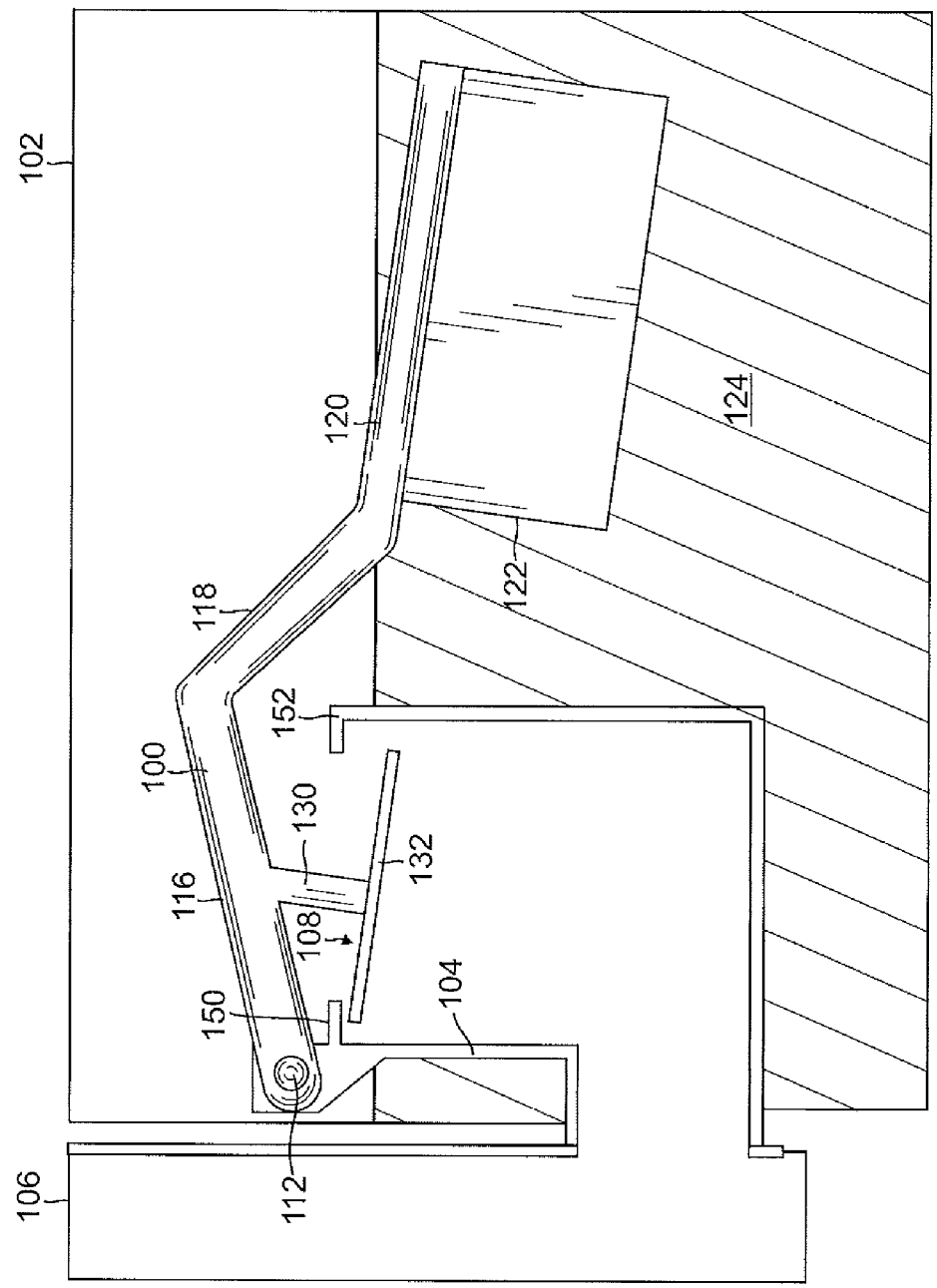
FIG. 3 is a diagram of the exemplary pressure regulating float valve having its seal plate forced down because of ullage pressure.

Referring to FIGS. 1 through 3, diagrams of a generalized architecture of a fuel tank system having an exemplary pressure regulating float valve 100 may be shown. This system may allow greater flexibility in the design of fuel tank structure, fuel tank vent systems or other fuel tank systems such as a fuel transfer or onboard inert gas generation system. The float valve 100 may function like a typical float valve until pressure in the tank 102 is increased beyond a threshold.

The fuel tank 102 may be positioned within a wing of an aircraft. The fuel tank 102 may have a positive dihedral that may use the pressure regulating float valve 100 at the wing tips to prevent fuel transfer during rotation from the wing fuel tank 102 to the surge tank 106.

A conduit 104 may open into the main fuel tank 102. The conduit 104 may enter the tank 102 from a bottom portion and extend upwards. The conduit 104 typically rises above the maximum level of fuel 124. At one end, the conduit 104 may exit into a surge tank 106. The surge tank 106 may receive ullage flow from the fuel tank 102 when a pressure differential exists between the surge tank 106 and the wing fuel tank 102.

The opening 108 of the conduit 104 into the fuel tank 102 may be of various configurations. The opening 108 of the conduit 104 into the fuel tank 102 may be circular, square or other shape and may depend on the conduit 104. At the top of the conduit 104, a first edge 150 and a second edge 152 may be provided. The first edge 150 may have a hinge 112. The hinge 112 may pivotally connect the pressure regulating float valve 100. Two or more hinges 112 may be used for connecting the valve 100. The hinge 112 connected to the first edge 150 may rotate the length of the float valve 100 in a clockwise or counter-clockwise direction. This rotation may generally be circular. In one embodiment, the fuel tank 102 may have a height such that the float valve 100 may be pivoted up and down. The height of the conduit 104 extending into the fuel tank 102 may also be adjusted so that the float valve 100 may have sufficient clearance to be pivoted.

The pressure regulating float valve 100 may include an arm connected to a hinge 112, seal plate 132 and buoyant member 122. A first section 116 of the arm may be connected to the hinge 112. At a distal end, the first section 116 may be connected to the second section 118 of the arm. The intersection of the first section 116 and the second section 118 may contact the second edge 152 of the conduit 104. The contact point at the second edge 152 of the conduit 104 may limit the amount of float valve 100 travel within the fuel tank 102.

The second section 118 of the arm may have a higher and lower point. The higher point of the second section 118 may be connected with the first section 116. The lower point of the second section 118 may be connected to the flat section 120 of the float valve 100 and may be positioned to correspond with normal fuel levels within the fuel tank 102. The second section 118 may be adjusted. For example, the second section 118 may be adjusted such that the lower point extends far into the fuel tank 102. The fuel tank 102 may then have a deeper configuration.

Continuing with FIGS. 1 through 3, the second section 118 of the arm may be connected to the flat section 120. The flat section 120 may provide a stable support for a buoyant member 122. In one embodiment, the arm may be connected to the buoyant member 122 directly without the flat section 120. The buoyant member 122 may be at a distal end from the hinge 112 connecting the first section 116 of the arm. Typically, the buoyant member 122 may have less of a density than the fuel 124 within the fuel tank 102, which may allow the buoyant member 122 to float above the level of fuel 124. The density of the buoyant member 122 may be adjusted. The buoyancy of the member 122 may also take into account of the weight of the float valve 100 or portions thereof.

The pressure regulating float valve 100 may have a seal plate 132. The seal plate 132 may be the size of the opening 108 of the conduit 104. In one embodiment, the seal plate 132 may be enlarged such that the contact made between the seal plate 132 may touch the first edge 150 and the second edge 152 of the conduit 104. In one embodiment, the seal plate 132 may be prevented from rising above the conduit 104 through the first edge 150 and the second edge 152. When the float valve 100 is raised, the seal plate 132 may cover the opening 108.

The seal plate 132 may be connected to the float valve 100 through a structure 130 as shown in FIGS. 1 through 3. The structure 130 may be connected to the first section 116. The structure 130 may be connected at an angle to the first section 116. The structure 130 may be connected to a center portion of the seal plate 132. The seal plate 132 may be circular, square or other shape and may depend on the opening 108 of the conduit 104 into the fuel tank 102.

In one embodiment, the structure 130 may extend into the conduit 104. This extension may place the seal plate 132 well within the conduit 104. When unsealed, the seal plate 132 may rest within the conduit 104. Because of the contact point at the second edge 152 of the conduit, the seal plate 132 may be suspended and not contact the walls within the conduit 104. When sealed, the structure 130 may raise above the opening 108 due to the float valve mechanism 100 rising with the buoyant member 122.

As shown in FIGS. 1 through 3, the pressure regulating float valve 100 may be designed to open when the tank pressure threshold is exceeded by properly sizing the buoyant member 122 and the seal plate 132. The opening 108 may relieve the pressure within the tank 102. When the pressure drops below the threshold, the valve 100 may close. Typically, this may occur assuming the level of the fuel 124 has not changed.

When the level of fuel 124 is decreased, the valve 100 may open. Advantageously, the pressure regulating float valve 100 may limit the pressure rather than relying on controls within other systems to limit pressure generation within the tank. In addition, additional optimization of vent line sizes and tank pressure limits may be realized.

As depicted in FIG. 1, a diagram of the generalized architecture of the fuel tank 102 having the exemplary pressure regulating float valve 100 in a lowered position may be shown. The low level of fuel 124 may be followed by the buoyant member 122. The valve 100 may be pivoted through the hinge 112 in a downward direction. The second edge 152 of the conduit 104 may prevent the float valve 100 from pivoting downwards fully. As shown, the seal plate 132 may be unseated from the opening 108 placing it in an unsealed position. A portion or the entire length of the structure 130 may be positioned within the conduit 104. The seal plate 132 may be within the conduit 104.

Turning to FIG. 2, a diagram of the exemplary pressure regulating float valve 100 in an elevated or sealed position may be shown. The level of fuel 124 may increase causing the buoyancy member 122 to rise. The member 100 may be placed in a sealing position when the level of fuel 124 reaches a predetermined limit. Through the hinge 112, the member 100 may have moved in a counter-clockwise circular motion. The flat section 120 connected to the second section 118 may have also risen.

The seal plate 132 may be brought upwards in contact with the first edge 150 and the second edge 152 of the conduit 104 through the float valve 100. The first edge 150 and the second edge 152 may prevent the seal plate 132 from being moved out of the conduit 104. The structure 130 may be positioned outside the conduit 104 and may seal the opening 108 with the seal plate 132. The seal plate 132 may make a tight seal to the opening 108 and may depend on the height of the buoyant member 122. By closing the opening 108 of the conduit 104 into the fuel tank 102, the float valve 100 may protect fuel 124 from spilling into the surge tank 106 through the conduit 104.

When ullage pressure begins to increase within the space between the fuel 124 and the top of the tank 102, pressurization of the wing fuel tank 102 may occur. Provided in FIG. 3, a diagram of the exemplary pressure regulating float valve 100 having its seal plate 132 forced down because of ullage pressure may be shown. Ullage pressure on the seal plate 132 may create a moment arm in the opposite direction, that is, downwards. At a particular pressure threshold, the float valve 100, due to the seal plate 132, may open to relieve the pressure. This may result in an actuated float valve 100 that may be pressure regulating. The float valve 102 may allow for positive ullage pressure to remove the sealing from the opening 108 of the conduit 104 and properly vent.

The pressure on the seal plate 132 may bring down the structure 130. The structure 130 may bring the first section 116 downwards through the hinge 112. This may bring the second section 118 downwards along with the flat section 120. The flat section 120 and the buoyant member 122 may then be positioned below the fuel 124 or a portion thereof as shown in FIG. 3.

The increased ullage pressure may force the seal plate 132 downwards and may allow the pressure to escape through the conduit 104. The seal plate 132 may no longer contact the first edge 150 and the second edge 152 of the conduit 104. Once the pressure is removed, the seal plate 132 may rise up again due to the buoyant member 122 and the fuel 124. When the level of fuel 124 lowers, the valve 100 may then pivotally rotate around the hinge 112. The float valve 100 may then lower the seal plate 132 connected to the structure 130.

In one embodiment, the pressure regulating float valve 100 may close when the level of fuel 124 is above the conduit 104 or slightly there below. Sections within the float valve 100 or the buoyant member 122 may be adjusted. The increase in fuel 124 may tighten the sealing of the opening 108 on the conduit 104. This may prevent fuel from entering into the surge tank 106 in such conditions.

Figure 4:
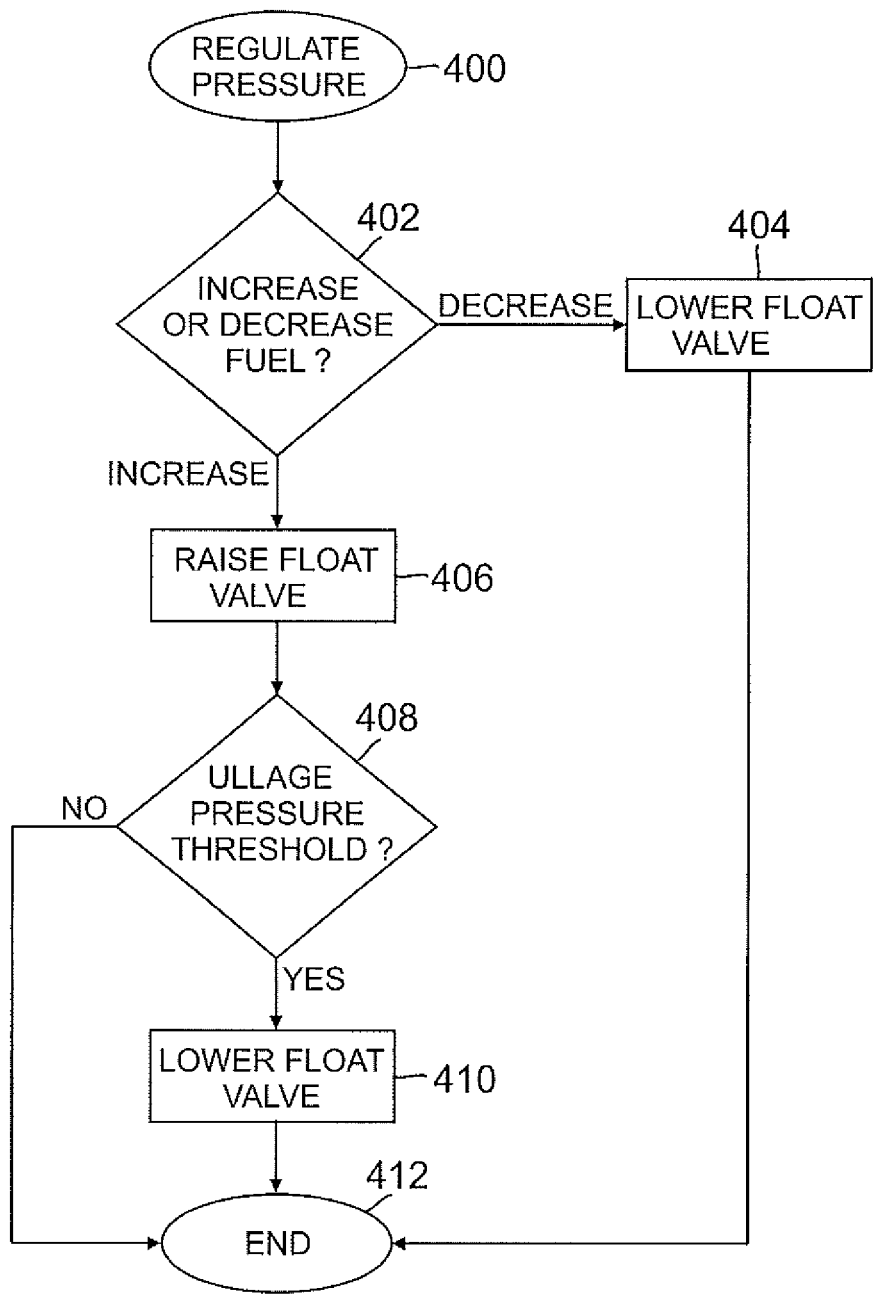
FIG. 4 is a flow chart having illustrative processes for regulating pressure through the float valve.

Referring to FIG. 4, a flow chart having illustrative processes for regulating pressure through the float valve 100 may be described. The processes may begin at block 400. At decision block 402, the float valve 100 may determine whether there has been an increase or decrease in fuel 124. Through the buoyant member 122 connected to the flat section 120 of the float valve 100, increases or decreases of fuel 124 may be detected. The buoyant member 122 may be connected at a distal end from the hinge 112 that allows the buoyant member 122 to move up and down. The buoyant member 122 along with the other sections of the float valve 100 may move in a circular motion.

When the fuel 124 level is decreased, the float valve 100 may be lowered at block 404. The first section 116, second section 118, flat section 120 and buoyant member 122 may pivot downwards around the hinge 112 in a clockwise direction as shown in FIG. 1. At the same time, the structure 130 goes down into the conduit 104 that brings the seal plate 132 more within the conduit 104. If the fuel 124 is low enough, the float valve 100 may contact the second edge 152 of the conduit 104. The processes may end at block 412.

Returning to decision block 402, the float valve 100 may be raised when the level of fuel 124 increases at block 406. The member 100 may begin moving in a counter-clockwise direction around the hinge 112 in a circular motion. The float valve 100 may be raised through the buoyant member 122 as shown in FIG. 2.

Continuing with FIG. 4, the fuel 124 level may increase to the point where the structure 130 connected to the seal plate 132 is no longer in the conduit 104. The seal plate 132 may begin to rise with the buoyant member 122 until the seal plate 132 reaches the opening 108. When enough pressure is applied upwards by the buoyant member 122, the opening 108 may shut preventing fuel 124 spillage into the surge tank 106 through the conduit 104.

At decision block 408, a determination may be made whether the ullage pressure has reached a threshold value within the fuel tank 124. The ullage pressure may occur when the fuel tank 102 pressure is increasing and vent openings are closed due to the quantity of fuel 124. When the threshold has not been reached, the processes for regulating pressure may end at block 412. The float valve 100 may be lowered or the pressure may be regulated constantly when the opening 108 is closed.

When the ullage pressure has reached a threshold value within the tank 102, relative to the surge tank pressure, at block 410, the seal plate 132 may be pushed downwards as shown in FIG. 3. Due to the configuration of the seal plate 132, the pressure may be exerted down on the seal plate 132. The float valve 412 may be lowered clockwise in a circular manner and may be pivoted around the hinge 112.

By removing the seal from the opening 108, the ullage pressure may escape to the surge tank 106. After the pressure is removed, the float valve 100 may once again be lifted upwards sealing the opening 108 to prevent fuel 124 spillage. The processes may end at block 412. A combination of the processes described above may be used and do not necessarily have to occur in the order presented above. For example, the float valve 100 may go upwards and downwards several times before the seal plate 132 is forced downwards to remove the ullage pressure.

While embodiments of the disclosure have been described in terms of various specific embodiments, those skilled in the art will recognize that the embodiments of the disclosure may be practiced with modifications within the spirit and scope of the claims.

What is claimed is:

1. A vent system for an aircraft comprising:
    a fuel section;
    a conduit having an opening into the fuel section, the opening having a first edge and a second edge; and
    a member pivotally connected to the first edge of the opening at a proximal end having a seal plate within the conduit sealing the opening into the fuel section when a buoyant section at a distal end rises along with the seal plate through the member with a rise in fluid level within the fuel section;
    wherein the second edge of the opening restricts a downward movement of the member, the member contacting the second edge when fluid within the fuel section is low.

2. A vent system for an aircraft in accordance with claim 1, wherein the sealing is removed when the fluid level within the fuel section is reduced.

3. A vent system for an aircraft in accordance with claim 1, wherein the sealing is removed when a threshold of ullage pressure builds up within the fuel section and forces the seal plate downwards.

4. A vent system for an aircraft in accordance with claim 3, wherein the ullage pressure forces the buoyant section to lower below the fluid level within the fuel section.

5. A vent system for an aircraft in accordance with claim 1, wherein the conduit comprises an opening into a surge tank.

6. A vent system for an aircraft in accordance with claim 1, wherein the member connected to the conduit is connected to the first edge through a hinge.

7. A vent system for an aircraft in accordance with claim 1, wherein the member is connected to the seal plate through a structure.

8. A vent system for an aircraft in accordance with claim 1, wherein a density of the buoyant section is adjustable.

9. A vent system for an aircraft in accordance with claim 1, wherein the member is connected to a top of the conduit.

10. A vent system for an aircraft in accordance with claim 1, wherein the conduit extends into a lower portion of the fuel section and the opening into the fuel section rises upwards.

11. A system comprising:
    a housing having a main section and a conduit opening into the main section; and
    a pressure regulating float valve comprising:
        a beam pivotally connected to a top of the conduit at a proximal end;
        a buoyant member connected at a distal end;
        a seal plate connected to the beam through a structure, the structure extending the seal plate into the conduit;
        wherein the buoyant member raises the seal plate and the structure through the beam and closes the opening into the main section with an increase of fluid within the main section;
        wherein the opening has a first edge and a second edge, the beam pivotally connected to the first edge of the opening, the second edge of the opening restricting a downward movement of the beam, the beam contacting the second edge when fluid within the main section is low.

12. A system in accordance with claim 11, wherein the beam comprises:
    a first section connected to the conduit opening through a hinge;
    a second section connected to the first section; and
    a flat section connected to the second section.

13. A system in accordance with claim 12, wherein the first section and second section contact the conduit at a point on the conduit opposite from the hinge.

14. A system in accordance with claim 12, wherein the seal plate overlaps the opening into the main section preventing fuel spillage.

15. A method for regulating pressure in a vent system for an aircraft comprising:

pivoting a beam around a hinge connected to a first edge of an opening in a conduit when a buoyant member connected at a distal end rises with a rise of fluid level within a fuel tank;

raising a seal plate within the conduit through the beam sealing the opening of the conduit when the fluid level within the fuel tank is at or above a predefined limit; and removing the sealing by depressing the seal plate when a threshold value of pressure is exceeded in the fuel tank, and correspondingly submerging the beam and buoyant member, wherein a second edge of the opening restricts a downward movement of the beam when the beam contacts the second edge.

16. A method for regulating pressure in a vent system for an aircraft in accordance with claim 15, wherein pivoting the beam comprises rotating the beam around the hinge.

17. A method for regulating pressure in a vent system for an aircraft in accordance with claim 15, comprising lowering the beam when the buoyant member connected to the beam drops with a lowering of fluid level within the fuel tank.

18. A method for regulating pressure in a vent system for an aircraft in accordance with claim 15, wherein sealing the opening of the conduit within the fuel tank prevents fuel spillage.

\* \* \* \* \*